(12) United States Patent
Voeller et al.

(10) Patent No.: US 8,904,863 B1
(45) Date of Patent: *Dec. 9, 2014

(54) TIRE CHANGER WITH ACTUATED LOAD ROLLER

(75) Inventors: David A. Voeller, St. Louis, MO (US);
Douglas S. Hanneken, St. Louis, MO (US); Steve Molbach, Ballwin, MO (US); Joel Clasquin, Edwardsville, IL (US); Michael D. Gerdes, St. Peters, MO (US)

(73) Assignee: Hunter Engineering Company, St. Louis, MO (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/564,109

(22) Filed: Aug. 1, 2012

Related U.S. Application Data

(63) Continuation of application No. 12/495,847, filed on Jul. 1, 2009, now Pat. No. 8,250,915.

(60) Provisional application No. 61/077,973, filed on Jul. 3, 2008, provisional application No. 61/107,080, filed on Oct. 21, 2008.

(51) Int. Cl.
*G01M 1/16* (2006.01)
*G01M 1/00* (2006.01)

(52) U.S. Cl.
USPC .............................. 73/460; 73/66

(58) Field of Classification Search
CPC ........... G01M 1/16; G01M 1/04; G01M 1/02; G01M 1/045; G01M 1/225; G01M 1/22; G01M 1/24; G01M 1/32; G01M 1/20; G01M 1/326; G01M 1/12

USPC .......... 73/66, 460, 462, 468, 146; 702/33, 34, 702/41; 33/203.13

See application file for complete search history.

(56) References Cited

U.S. PATENT DOCUMENTS

| 4,223,386 | A | 9/1980 | Maruyama et al. |
|---|---|---|---|
| 4,956,995 | A | 9/1990 | Harrold et al. |
| 5,365,786 | A | 11/1994 | Douglas |
| 6,324,908 | B1 | 12/2001 | Colarelli, III et al. |
| 6,336,364 | B1 | 1/2002 | Parker et al. |

(Continued)

FOREIGN PATENT DOCUMENTS

| DE | 1281720 | 10/1968 |
|---|---|---|
| EP | 0897107 A2 | 2/1990 |

(Continued)

*Primary Examiner* — Helen Kwok
(74) *Attorney, Agent, or Firm* — Polster, Lieder, Woodruff & Lucchesi, L.C.

(57) ABSTRACT

A tire changer with a controller includes a with a mount assembly adapted for contacting a wheel assembly to mount the wheel to a rotating spindle. The tire changer controller is configured to regulate the operation of a motor which is operatively connected to the rotating spindle to rotate the wheel assembly. A sensor coupled to the controller provides a data representative of the rotational position of the wheel assembly about a rotational axis. The controller is further configured to regulate the operation of a hydraulic actuating means for engaging a load roller with the wheel assembly to apply a radial force to a tire mounted on a rim of the wheel assembly during rotation of the wheel, and to regulate the operation of a tire handling means and mount assembly, enabling identification, marking, and adjustment of the tire angular mounting position relative to the wheel rim.

20 Claims, 11 Drawing Sheets

(56) References Cited

U.S. PATENT DOCUMENTS

| | | |
|---|---|---|
| 6,386,031 B2 | 5/2002 | Colarelli, III et al. |
| 6,389,895 B2 | 5/2002 | Colarelli, III et al. |
| 6,393,911 B2 | 5/2002 | Colarelli, III et al. |
| 6,397,675 B1 | 6/2002 | Colarelli, III et al. |
| 6,405,591 B1 | 6/2002 | Colarelli, III et al. |
| 6,422,074 B1 | 7/2002 | Colarelli, III et al. |
| 6,435,027 B1 | 8/2002 | Colarelli, III et al. |
| 6,439,049 B2 | 8/2002 | Colarelli, III et al. |
| 6,481,282 B2 | 11/2002 | Douglas et al. |
| 6,523,408 B1 | 2/2003 | Colarelli, III et al. |
| 6,546,635 B1 | 4/2003 | Gerdes |
| 6,581,463 B1 | 6/2003 | Colarelli, III et al. |
| 6,609,424 B2 | 8/2003 | Colarelli, III et al. |
| 6,799,460 B1 | 10/2004 | Parker et al. |
| 6,854,329 B2 | 2/2005 | Colarelli, III et al. |
| 7,355,687 B2 | 4/2008 | Voeller et al. |
| 7,495,755 B2 | 2/2009 | Voeller et al. |
| 8,250,915 B1 * | 8/2012 | Voeller et al. .................. 73/460 |
| 2009/0301192 A1 | 12/2009 | Douglas et al. |

FOREIGN PATENT DOCUMENTS

| | | |
|---|---|---|
| EP | 0671621 A2 | 2/1995 |
| EP | 1054247 A2 | 11/2000 |
| EP | 1054247 A3 | 2/2002 |
| EP | 2361791 A1 | 8/2011 |
| WO | 2011101006 A1 | 8/2011 |

\* cited by examiner

TIRE CHANGER WITH ACTUATED LOAD ROLLER

CROSS-REFERENCE TO RELATED APPLICATIONS

The present application is a continuation of U.S. patent application Ser. No. 12/495,847 filed on Jul. 1, 2009, herein incorporated by reference, and which in turn is related to, and claims priority from, U.S. Provisional Patent Application Ser. No. 61/077,973 filed on Jul. 3, 2008, herein incorporated by reference, and from U.S. Provisional Patent Application Ser. No. 61/107,080 filed on Oct. 21, 2008, herein incorporated by reference.

STATEMENT REGARDING FEDERALLY SPONSORED RESEARCH

Not Applicable.

BACKGROUND OF THE INVENTION

This invention relates generally to tire changing apparatus, and more specifically to tire changing apparatus with the capability of measuring at least one uniformity parameter of a wheel/tire assembly and which incorporates an actuation means for applying a load to the tire of a wheel/tire assembly mounted to the tire changing apparatus, via a load roller assembly during a tire changing procedure.

Much effort has gone into reducing the vibration of wheel/tire assemblies while a vehicle is in motion. Wheel balancers are commonly used to reduce static and dynamic imbalances in a wheel/tire assembly which result in measured vibrations. These systems determine a measure of unbalance in vehicle wheel/tire assemblies by an analysis of the mechanical vibrations caused by rotating the wheel/tire assembly. The mechanical vibrations are measured as motions, forces, or pressures by means of transducers, which convert the mechanical vibrations to electrical signals. Wheel/tire assembly unbalance may result from unbalance in the wheel, unbalance in the tire, or both.

Even when a wheel/tire assembly is properly balanced, such as by the application of imbalance correction weights to the assembly, non-uniformity in the construction of the tire or a runout in the wheel rim can cause significant vibration forces as the wheel/tire assembly rolls across a road surface under vehicle load conditions. Most tire manufacturers inspect their tires on tire uniformity machines and grind surface material off the tires as required to improve rolling characteristics of the tires. Even after this procedure, tires will often produce significant vibration forces (not related to imbalance) of as they roll on a smooth road.

Conventional wheel balancers also have more subtle deficiencies that arise in connection with compensating for runout and in tire matching. For example, wheel rim runout is frequently measured from the "outside" of the rim (i.e., that portion of the wheel rim that is exposed to view once the tire is mounted thereon. If the wheel rim runout measured on the "outside" portion of the rim does not correspond to the runout of the bead seat surface itself (which is on the "inside"), errors may be introduced in an attempt to match or compensate out-of-round conditions on a tire with the out-of-round conditions on the associated wheel rim by adjusting the rotational position of the tire relative to the wheel rim.

Even if the actual bead seat surface is used to measure runout in a wheel rim, errors can still result. For example, if the bead seat method is used to obtain a measure of rim runout, the rim must be removed from the balancer for mounting the tire and then remounted to the balancer to measure wheel/tire assembly force variations. Any centering difference with respect to the mounting of the rim on the spindle of the balancer will result in errors in the determination of the rim runout, the assembly force variation, and the tire force variation computation. This "centering error" can become even more significant with larger wheel/tire assemblies. Similarly, with conventional wheel balancing equipment, after mounting the tire on the rim, the rim must be mounted at exactly the same angular position relative to the spindle as it was mounted in the rim runout measurement step. Otherwise the angle of the recalled rim contribution will be incorrect and so will the resulting tire computation In addition to runout, state of the art wheel balancing products measure additional tire uniformity parameters, including lateral forces. Radial ply automotive tires generate lateral forces due to design parameters and manufacturing process variations. It is possible for the lateral forces to have undesirable effect on the vehicle, such as is disclosed in U.S. Pat. No. 6,546,635, herein incorporated by reference.

It should be understood from the above that substantially eliminating wheel/tire assembly vibration is a complex task that conventionally requires a wheel balancer to accomplish. Generally, conventional wheel balancer systems are complex, and relatively expensive pieces of equipment that performs their specific functions well. Conventional wheel balancer systems have a shaft that is used to rotate the wheel/tire assembly, and are generally designed so that the balancer shaft is exactly centered in the center bore hole of the wheel rim. Because it is vitally important for the wheel to be mechanically mounted coaxially to the balancer shaft in order to achieve a good balance, the shaft and other balancer components used in mounting the wheel/tire assembly are all made to extremely tight tolerances.

In contrast, tire changing systems, used to mount and dismount a tire from a wheel rim, are very different from wheel balancer systems, and are designed for a different purpose. As a result, the method for mounting a wheel assembly onto a tire changer is quite different from that used in wheel balancers. Unlike a wheel balancer system which uses a center shaft mounting for balancing purposes, a tire changer system may support the wheel/tire assembly at an edge of the wheel or rim.

There are three reasons for this: (1) the lateral force necessary to unseat the tire bead from the rim bead seat is very high, and it is often advantageous to clamp the rim as close to the bead seat area as possible, and (2) this type of mounting is quicker than mounting through the center hole on a wheel rim, and (3) centering of the wheel/tire assembly on a tire changer is not as critical as it is on a wheel balancer. This mounting method makes it very difficult for the rim's center bore hole to be perfectly centered about the center point of the tire changer rotational means. Because the rim's center bore hole does not perfectly rotate about the rotational center when mounted on a tire changer, an imaginary circle created by the tangent to the outer edge of the center bore hole of the wheel rim furthest away from the center point of the tire changer rotational means is larger than the center bore hole itself.

Modern tire changers are now being developed with center spindles for mounting wheels in much the same manner as wheel balancer systems. A hub face is used to contact the rear surface of the wheel rim that contacts the vehicle hub, with a cone and center shaft used to center and clamp the wheel to the hub face. The reason for this is that wheels are becoming larger in diameter. Therefore it is more difficult, and expensive, to create a device to clamp the wheel near its edge. Since the wheels are more expensive it is also desirable to ensure that the wheel does not become damaged due to clamping. By not clamping on exposed surfaces near the rim edge it is easier to protect the wheel rim. Common wheel balancer clamping accessories, such as cones, cups and flange plates can be used to both clamp and protect the wheel. These parts do not need to made to the tight tolerances that are used on a wheel balancer, but the use of the parts is the same.

BRIEF SUMMARY OF THE INVENTION

Briefly stated, the present disclosure provides a tire changer with a mount assembly adapted for contacting a wheel to mount the wheel to the tire changer, the wheel having a rim with at least one bead seat for contacting a tire and also having a wheel center bore hole. The changer further includes a motor operatively connected to the mount assembly for rotating the mount assembly about a rotational axis of the tire changer to rotate the wheel, a sensor for measuring rotational position of the axis, and a load roller for applying a generally radial force to a tire mounted on the wheel during rotation of the wheel.

In an embodiment of the present disclosure, the motor is a hydraulic motor coupled to a control system configured to regulate a flow of hydraulic fluid through the motor to control rotational speed, rotational torque, and rotational positioning of the mount assembly and a wheel assembly disposed thereon.

In an embodiment of the present disclosure, a hydraulic actuating means is associated with load roller, and is configured to bring the load roller into radial engagement with a wheel assembly on the mount assembly to apply radial forces thereto. The hydraulic actuating means may be a hydraulic tilt cylinder operatively coupled to the load roller support structure, or may be an actuating assembly configured to displace either the load roller or the mount assembly in a direction perpendicular to the axis of rotation to achieve the desired engagement and applied radial forces.

In an alternate embodiment, the tire changer of the present disclosure further includes a tire handling means to hold an unseated tire against rotation relative to the wheel rim, facilitating automatic rotational alignment of the wheel rim and tire.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
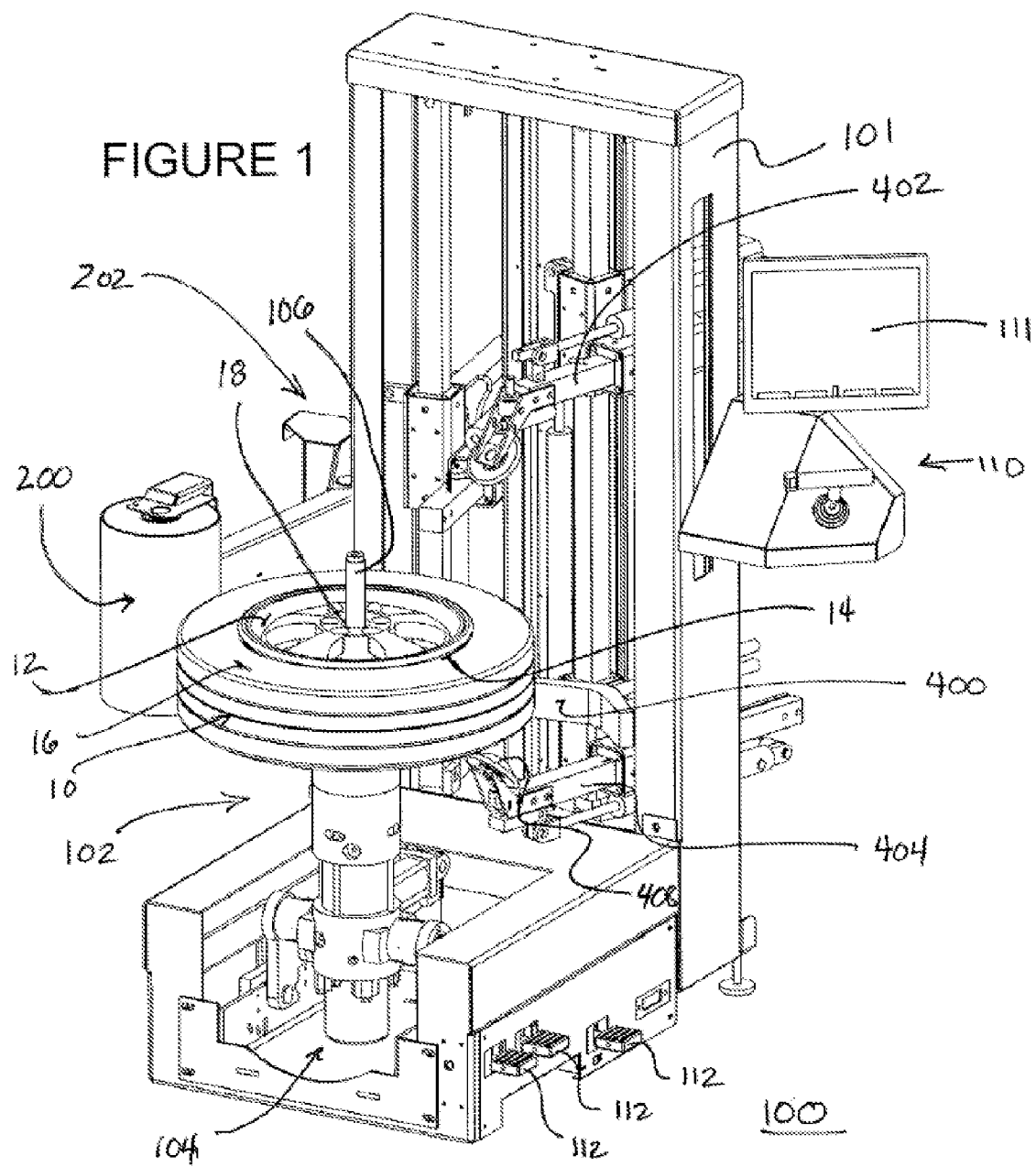
FIG. 1 is a perspective view of a tire changing system incorporating a side-mounted load roller of the present disclosure.
Figure 2:
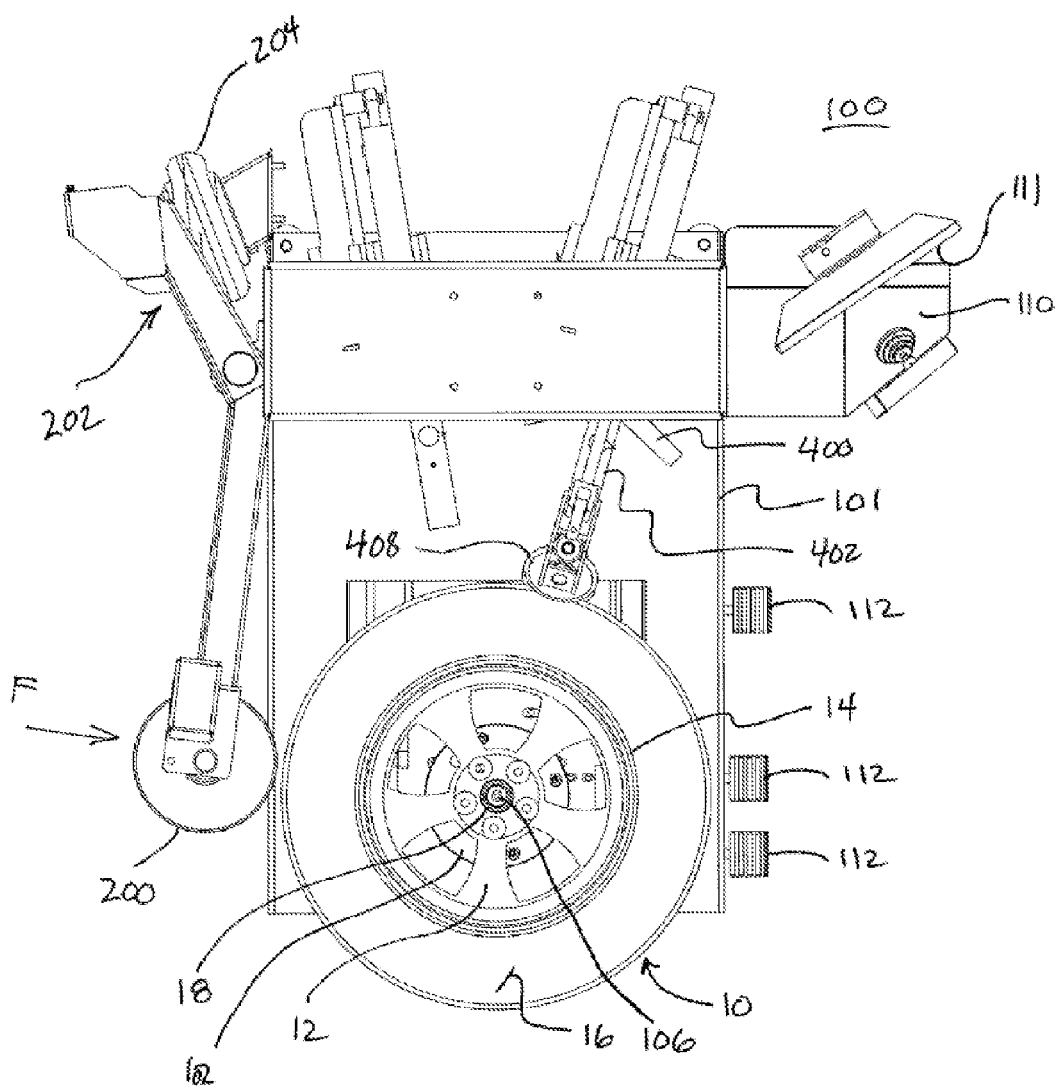
FIG. 2 is a top plan view of the tire changing system of FIG. 1.
Figure 3:
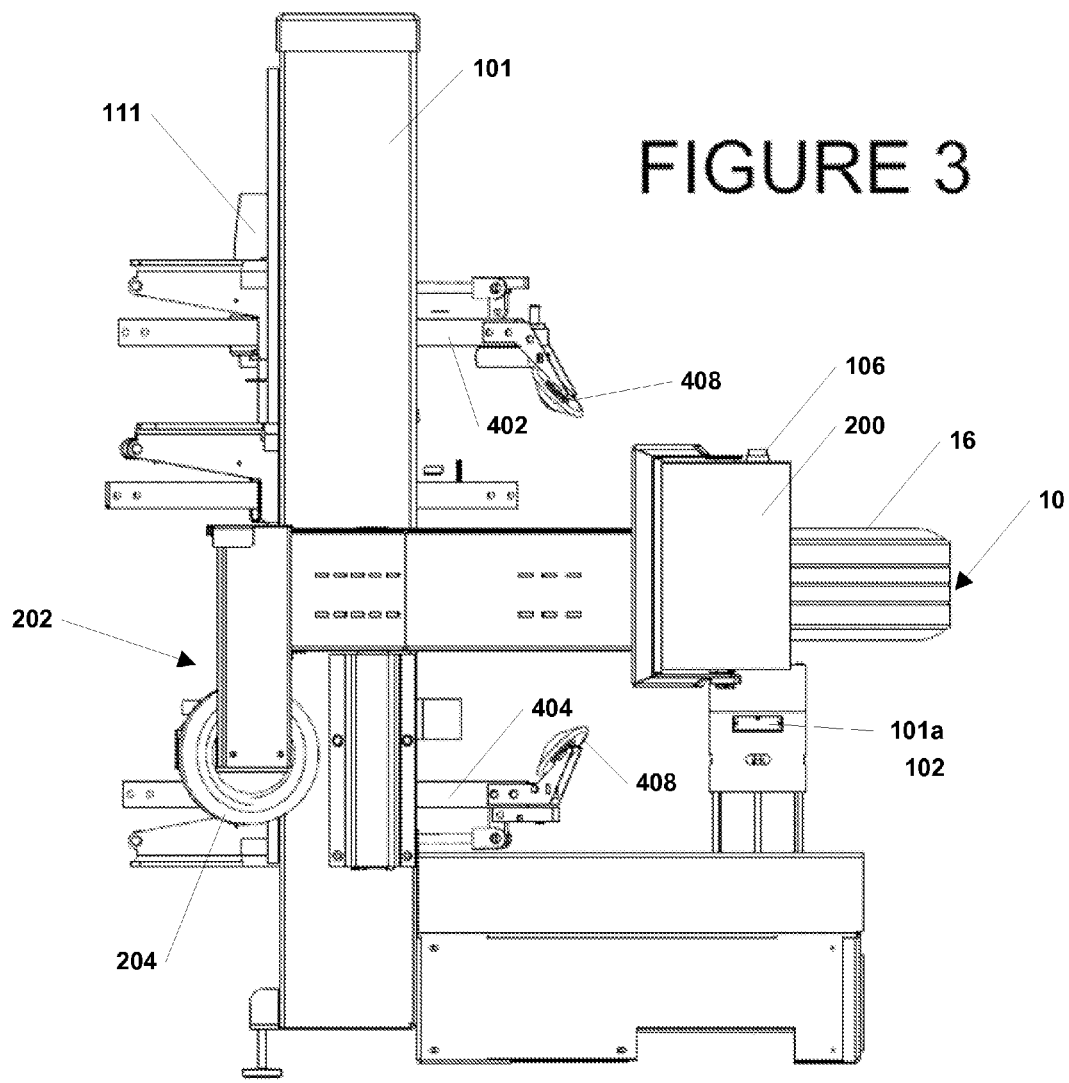
FIG. 3 is a side plan view of the tire changing system of FIG. 1, taken on the load roller side.
Figure 4:
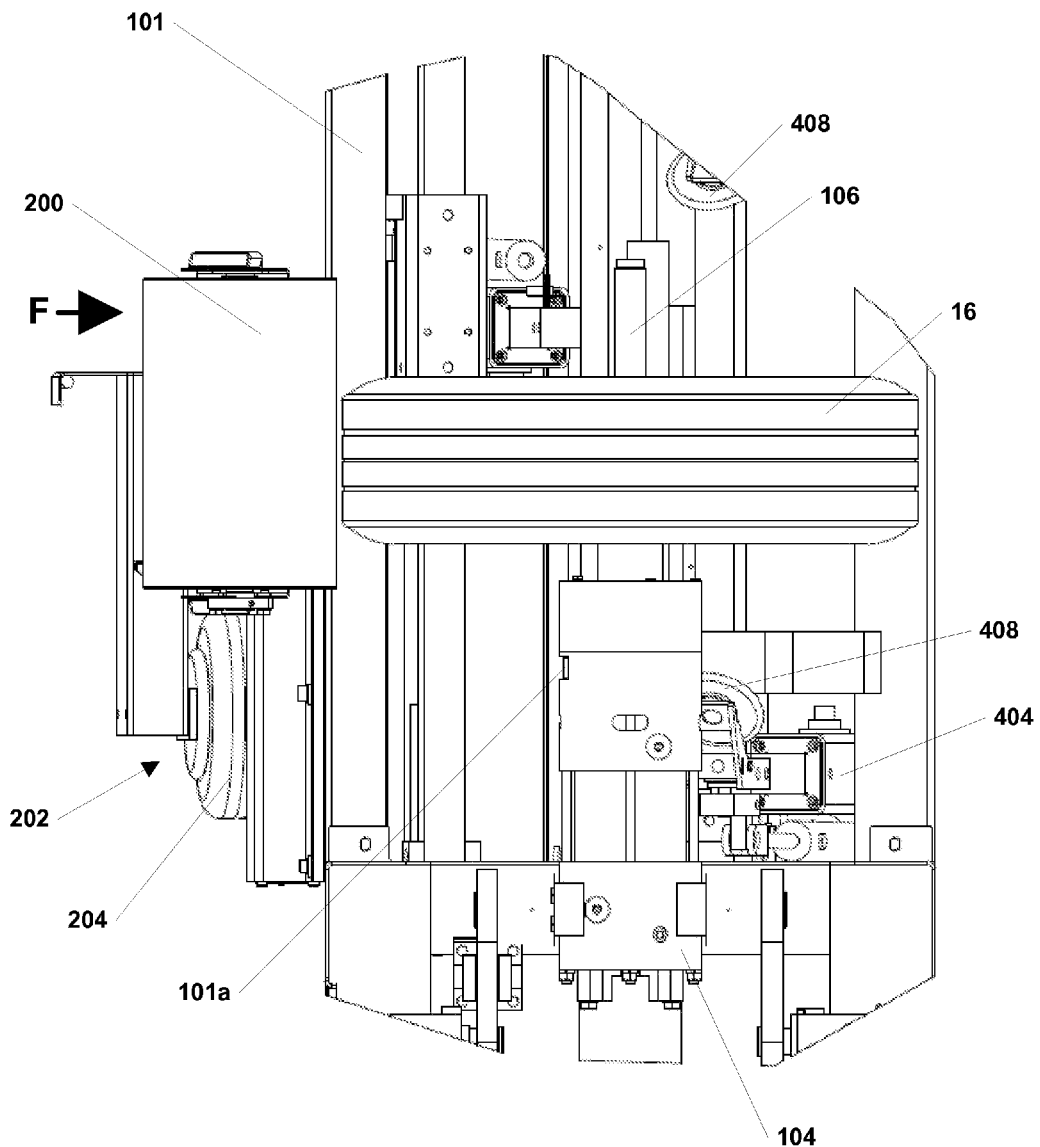
FIG. 4 is a partial front plan view of the tire changing system of FIG. 1.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

A tire changer 100 of the present invention includes a framework 101 supporting a mount assembly 102, a motor 104, one or more sensors, and a load roller 200 for applying a radial load to a wheel/tire assembly 10 secured to the mount assembly 102. As used herein, the term "wheel/tire assembly" refers generally to a combination of a wheel or rim 12 having bead seats 14 with a tire 16 mounted thereon. The mount assembly 102 is adapted for contacting a wheel (rim) 12 of a wheel/tire assembly 10 to mount the wheel 12 to the tire changer 100. The wheel 12 includes a wheel center bore hole 18. The mount assembly 102 may contact the wheel/tire assembly 10 at the wheel 12 in the conventional manner, or it may contact the wheel 12 at the bore hole 18.

Within the tire changer 100, the motor 104 is operatively connected to the mount assembly 102 for rotating the mount assembly 102 about a rotational axis of the tire changer 100, in order to rotate the wheel/tire assembly 10. If the tire changer 100 includes an optional shaft 106 for mounting the wheel/tire assembly 10, the rotational axis is preferably the longitudinal axis of the tire changer shaft 106. Sensors 101a such as an optical encoder as will become apparent below, are operatively disposed within the tire changer 100 to measure the rotational position of the axis. An operator interface 110, including various inputs and a display 111 may be supported on the framework 101 for providing operator control of the tire changer 100. Additional operator controls, such as foot pedals 112, may be coupled to the framework 101 and linked to associated controlled components as is conventional for tire changing systems.

Figure 7:
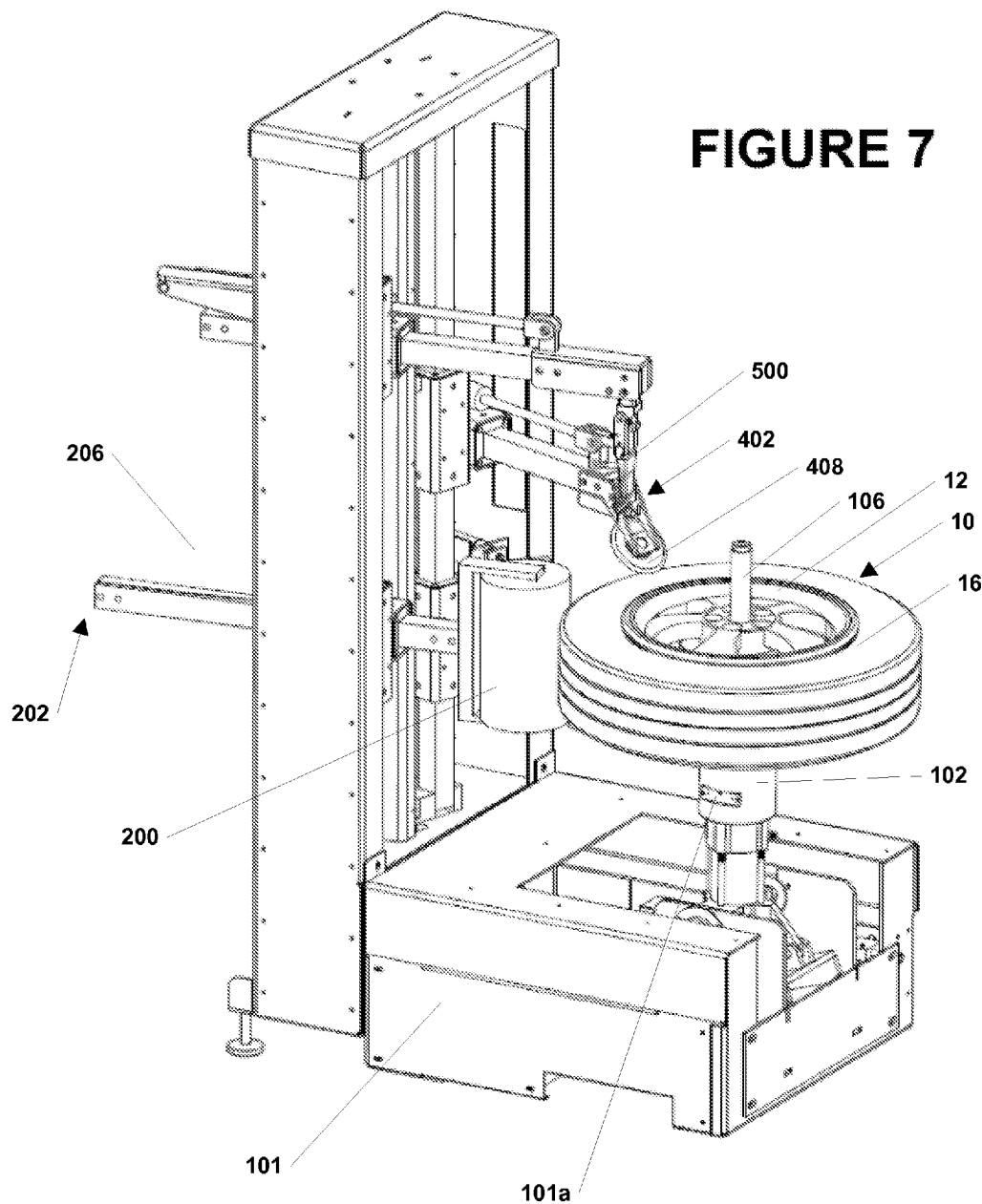
FIG. 7 is a perspective view of an alternate embodiment of the tire changing system, incorporating a hydraulically actuated load roller.
Figure 8:
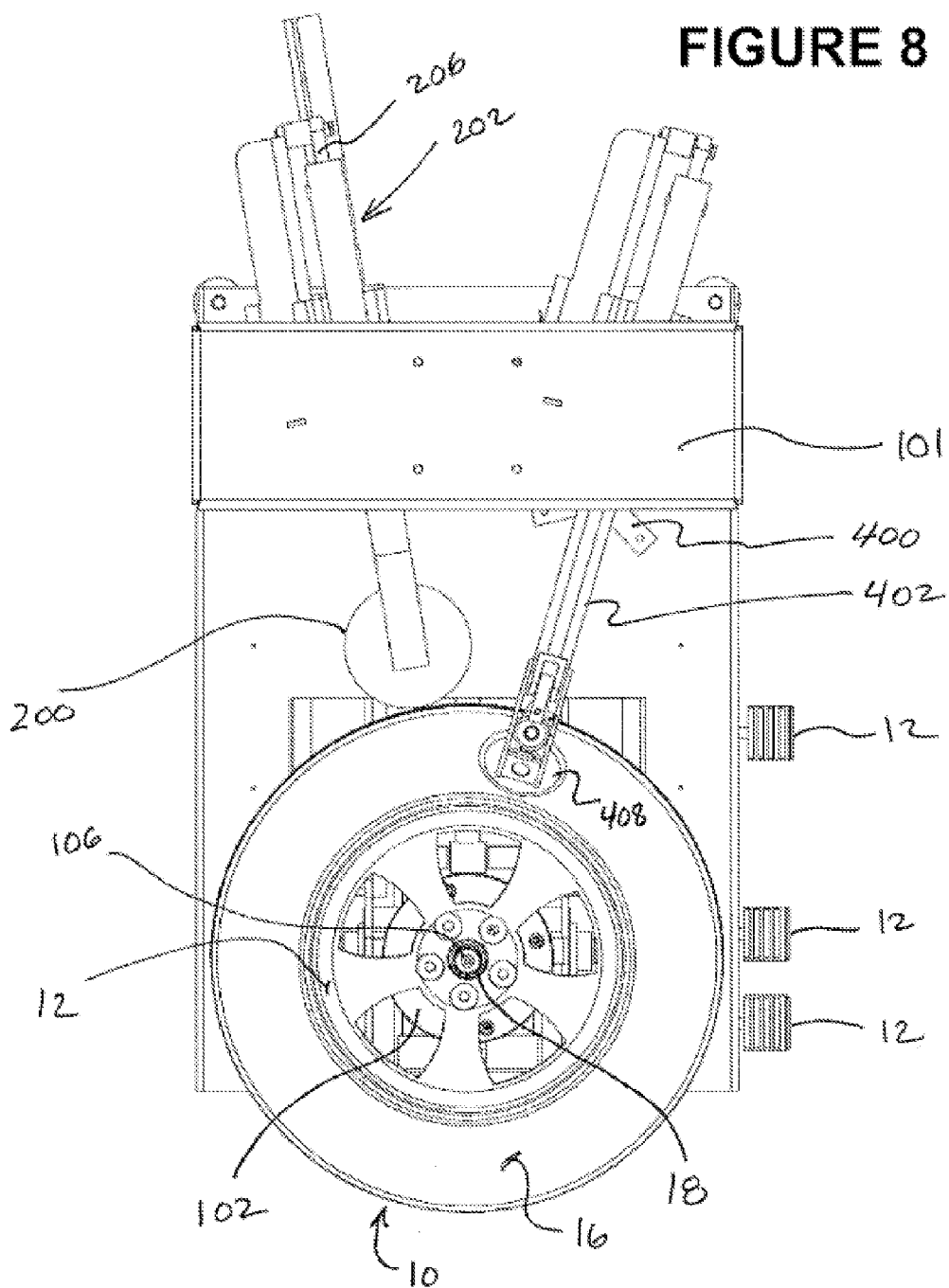
FIG. 8 is a top plan view of the tire changing system of FIG. 7.
Figure 9:
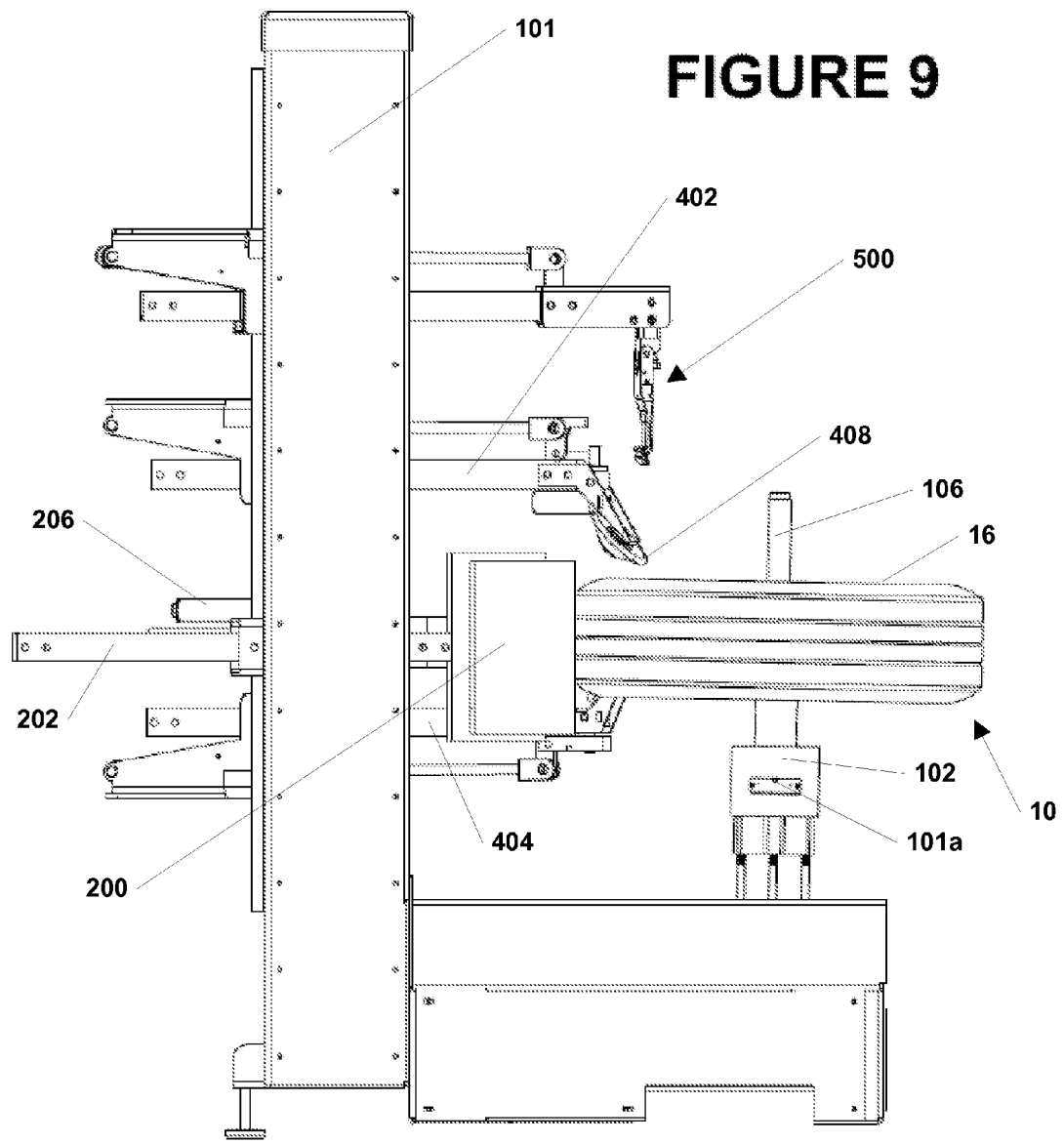
FIG. 9 is a side plan view of the tire changing system of FIG. 7, taken on the load roller side.

The load roller 200 is configured with an actuation mechanism 202 to apply a generally radial force "F" to the tire 16 mounted on the wheel/tire assembly 10 during rotation of the wheel/tire assembly 10 about the axis of the mount assembly 102. In one embodiment, shown in FIGS. 1-4, the load roller 200 is pneumatically actuated or engaged with the wheel/tire assembly 10 by the controlled inflation of an air bag 204, which pivotally displaces the load roller 200 into an engaged position. Alternatively, as shown in FIGS. 7-9, a hydraulic actuator 206 may be utilized to linearly drive the load roller 200 into engagement with the wheel/tire assembly 10, and to hold the load roller 200 in place. The radial and lateral forces on the wheel/tire assembly 10 can then be measured directly using load cells or force sensors 201 associated with the actuator or support structure 202. In one embodiment, the actuation mechanism 202 is configured to move either the spindle or the load roller 200 in a direction perpendicular to the axis of rotation so that the wheel/tire assembly 10 and roller are brought into contact with each other. Alternatively, the actuation mechanism 202 may be configured to move the load roller 200 in a pivoting or arcuate movement for engagement with the wheel/tire assembly 10

When the load roller 200 is configured to apply the generally radial force F to the tire 16 mounted on the wheel 12 during rotation of the wheel 12 by the motor 104, sensors (not shown) associated with the load roller 200 obtain a loaded wheel/tire assembly measurement with respect to the rotational axis of the wheel 12. For example, the loaded measurements may be received from displacement sensors monitoring movement of the load roller 200 and which are representative of a loaded radial runout of the wheel/tire assembly 10, or the measurements may be obtained from pressure sensors 201 and associated variations in the radial force F, or may be related to a measure of the observed stiffness of the tire 16. Alternatively, the loaded measurements acquired can be a measurement of a lateral force exerted by the wheel/tire assembly 10 during rotation. Additional sensors (not shown) may be associated with the load roller 200, such as a feedback sensor (in the form of a pressure transducer) to measure forces generated by load roller 200 when in contact with the rotating wheel/tire assembly 10, a sensor to measure movement of the load roller to determine loaded radial runout of the wheel/tire assembly while force "F" is applied to the assembly.

Figure 10:
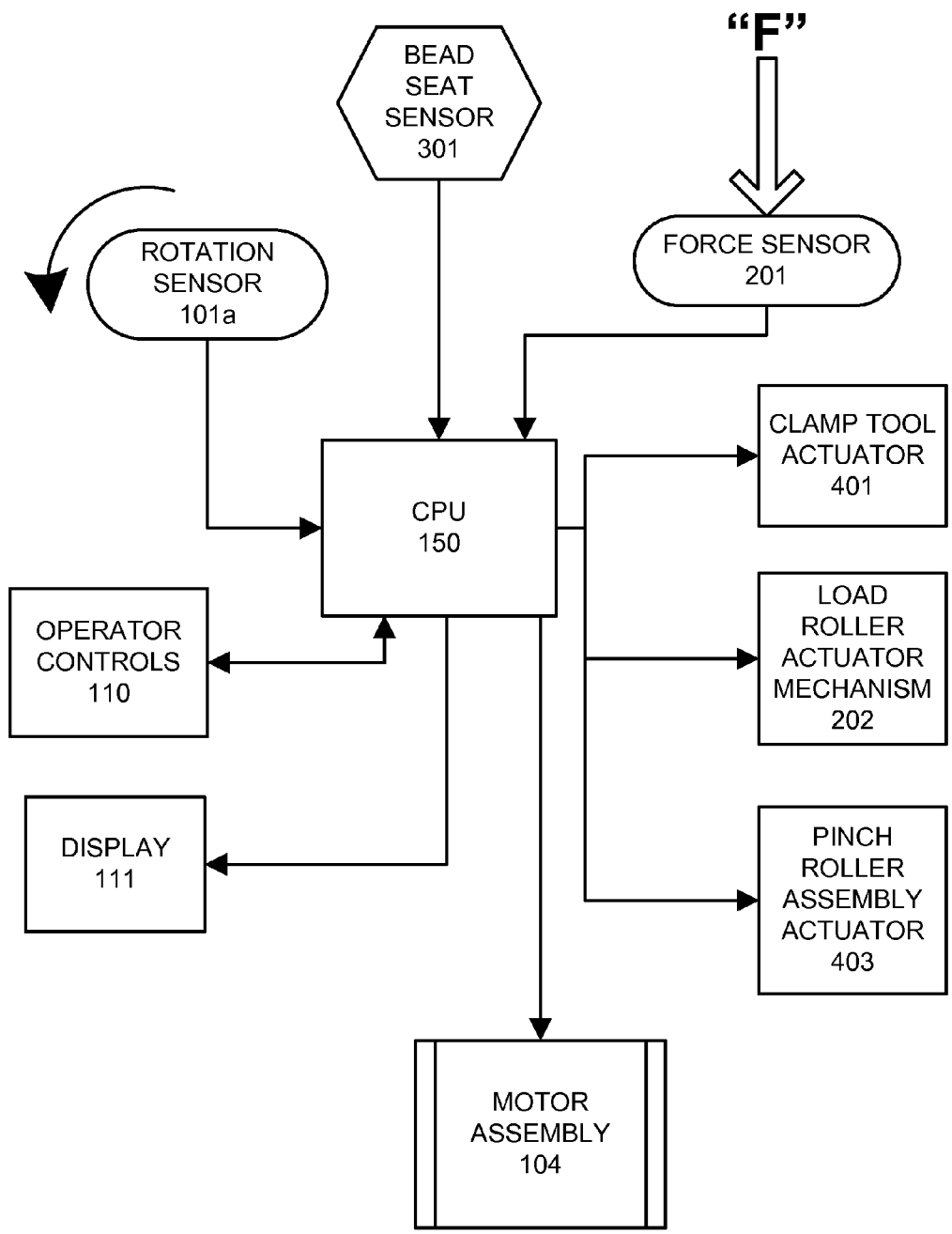
FIG. 10 is a block diagram illustrating the operational components of the tire changing system.

The control system 150 for the tire changing system 100, as shown in FIG. 10, is operatively connected to the load roller 200 and the load roller actuation mechanism 202 to control movement of the load roller 200 to vary the force "F" applied to the wheel/tire assembly 10. Preferably, the control system varies the force "F" applied by the load roller 200 from one wheel/tire assembly 10 to another, as a function of at least the diameter of the wheel/tire assembly 10, a width of the tire 16, a tire diameter, and/or a rim diameter. The control system may also be responsive to an operator-selected tire parameter to adjust the force 'F' applied by load roller 200. Optionally, the operator interface 110 may be used to manually input to the control system 150 a desired force "F" to be applied by the load roller 200. Those of ordinary skill in the art will recognize that the control system 150 may be configured to adjust the force "F" applied by the load roller 200 during rotation of the wheel/tire assembly 10 or other testing of the wheel/tire assembly 10.

It will be recognized that in order to obtain measurements which are representative of loaded operating conditions for a wheel/tire assembly 10, the load roller 200 must apply a considerable force 'F" to the wheel/tire assembly 10. The force "FF can be greater than 150 pounds, 400 pounds, or even 900 pounds, although no particular amount of force is required in the broadest aspect of the present invention. Preferably, the control system 150 signals the load roller actuation mechanism 202 to apply the desired force "F" on the wheel/tire assembly 10 with the load roller 200 during at least one complete revolution of the wheel/tire assembly 10, after which the load roller 200 is disengaged from the wheel/tire assembly.

Optionally, a bead seat runout sensor 301, which may be mechanical or optical can, as desired, measure radial and/or lateral runout of the wheel bead seat 14. If desired, sensors 101a may be incorporated into the mount assembly 102 for monitoring the angular position of the wheel 12 about the axis of rotation. The angular positions sensors 101a, in combination with the bead seat runout sensors, provide signals to a control system 150 for the tire changer 100. The control system 150, which may be any suitable programmable circuit configured to implement the required instructions, is responsive to the measurement of the wheel rim runout and to the loaded wheel/tire assembly force measurements received from the various sensors to determine an angular remount position of the tire 16 on the wheel rim 12 to minimize one or more predetermined uniformity parameters of the tire 16 or wheel/tire assembly 10.

The resulting determinations and/or measured values may be displayed to the operator on the display 111, under control of the control system 150. Such a display 111 may provide to the operator the angular remount position of the tire 16 with respect to the wheel rim 12 that would minimize the predetermined uniformity parameter for the wheel/tire assembly 10. The control system 150 is preferably configured to determine and provide one the display 111 a representation of a value of the uniformity parameter which would result were the tire 16 to be remounted to the indicated angular remount position on the wheel rim 12.

It is preferred that the loaded wheel/tire assembly measurements and the wheel rim runout measurements be taken while the wheel/tire assembly 10 is rotated at a relatively low speed, such as less than approximately 1.0-0.5 Hz. In general, the control system 150 is configured to control operation of the motor 104 to rotationally drive the mount assembly 102 with controlled speed, torque, and positioning. The motor 104 may be any controlled drive system suitable for rotationally driving the mount assembly 102, such as an electrical motor or a hydraulic motor. Correspondingly, the control system 150 will be understood to consist of the necessary electronic hardware, software, mechanical, and/or hydraulic components required to regulate the speed, torque, and rotational position of the wheel.

In a preferred embodiment of the invention, the control system 150 is configured to control the motor 104 to rotate the wheel/tire assembly 10 on the mount assembly 102 to position the angular remount position of the tire 16 in a predetermined rotational location, to facilitate identification of the angular remount position. Similarly, the control system 150 is configured to control the motor 104 to rotate the wheel/tire assembly 10 on the mount assembly 102 to position the rim remount position on the wheel 12 in a predetermined rotational location, to facilitate identification of the rim remount position.

The measurements acquired by the various sensors for determining runout of a wheel rim 12 are preferably acquired over at least two complete revolutions of the wheel/tire assembly 10 on the mount assembly 102. Measurements from successive revolutions of the rim 12 are preferably compared by the control system 150 to determine whether the measurements fall within a predetermined threshold of each other from one revolution to the next. The control system 150 is, in a preferred embodiment, responsive to observed differences in these measurements exceeding a predetermined threshold, to acquire additional roundness measurements to identify and detect mis-alignment or mis-mounting of the wheel/tire assembly 10 on the mount assembly 102.

In one embodiment, the control system 150 can control the motor assembly 104 to rotate the wheel/tire assembly 10 such that the location on the tire 16 mounted on the wheel 12, which has the largest radial first harmonic (R1H) out-of-round condition is rotated to a predetermined rotational position to facilitate operator identification of the R1H position. That R1H position on the tire 16 is preferably marked by the operator for subsequent placement aligned with a predetermined orientation on a hub of a vehicle (not shown) on which the wheel/tire assembly is to be mounted.

Figure 6:
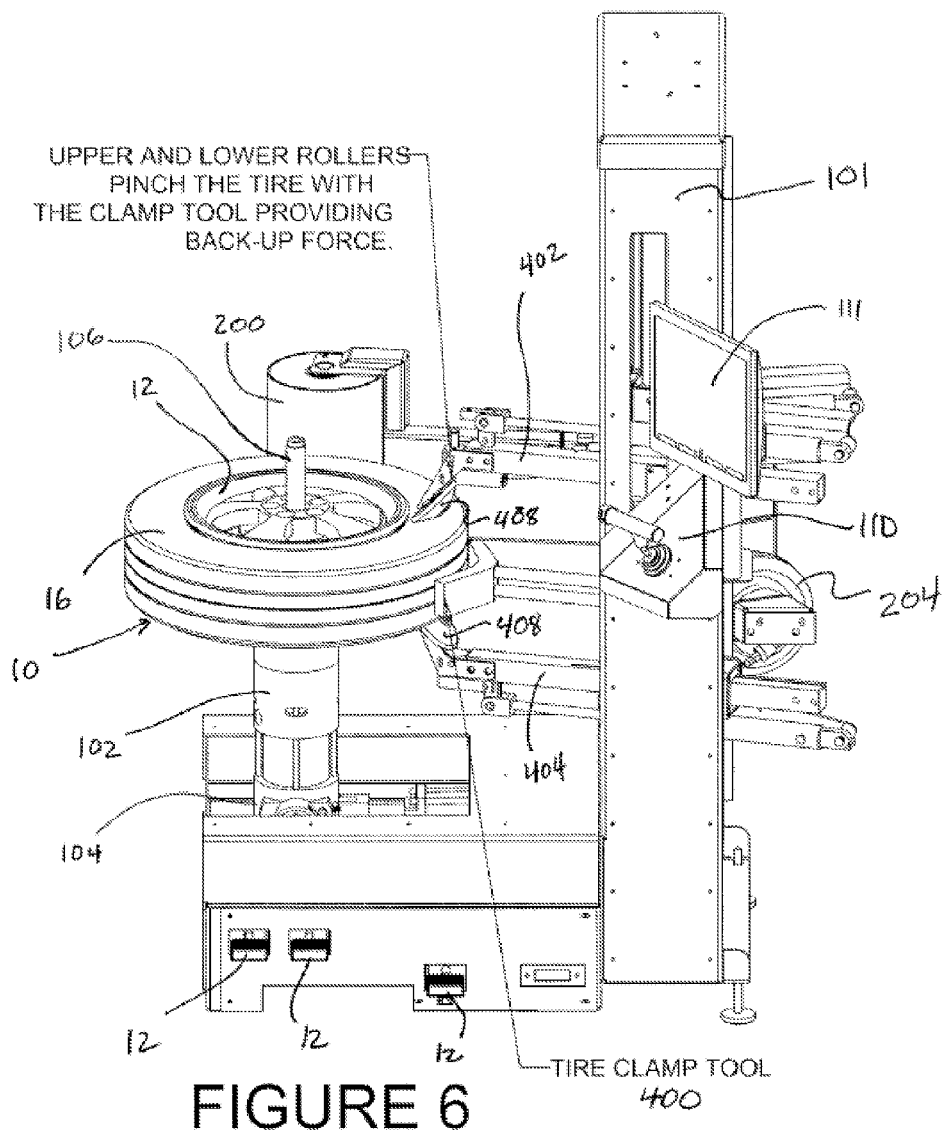
FIG. 6 is a perspective view of an alternate embodiment tire changing system incorporating both a load roller and tire clamping tool of the present disclosure.

In an alternate configuration, such as best seen in FIG. 6, a tire changing system of the present disclosure may be configured with an actuator or clamp tool 400 which may be extended or driven radially inwards towards the mounting assembly axis by a clamp tool actuator 401 under control of the control system 150 to grab or hold the tire 16 and prevent the tire 16 from rotating as the wheel 12 is rotated by the mount assembly 102. The control system 150 determines the locations on the wheel 12 and tire 16 that must be aligned to alter a selected uniformity parameter. Instead of rotating the tire 16 and wheel 12 locations to predetermined positions for marking and subsequent re-mounting of the tire 16 on the wheel 12, the tire 16 is instead held stationary by the actuator or clamp tool 400 with while the wheel 12 is rotated within the tire 16 to rotationally align the tire 16 and wheel 12. Optionally, in addition to the actuator or clamp tool 400, upper and lower pinch roller assemblies 402 and 404, supporting rollers 408 conventionally used to facilitate displacement of the tire 16 from the wheel bead seats 14 during mounting and dismounting, may be engaged by associated actuation systems 403 with the tire 16 in conjunction with the actuator or clamp tool 400 to provide additional clamping or holding force to secure the tire 16 against movement while the wheel 12 is rotated within the tire 16.

Figure 5A:
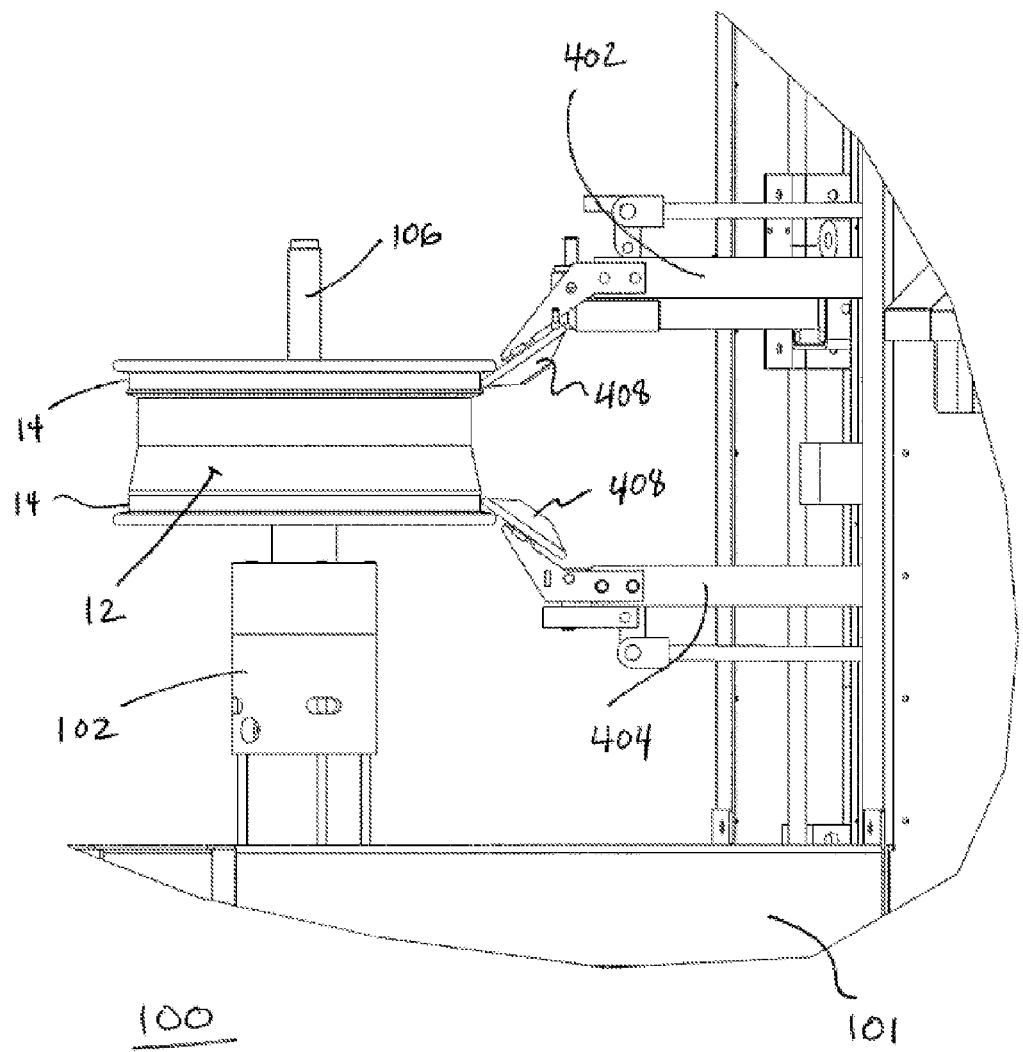
FIG. 5A is a partial side plan view of the tire changing system of FIG. 1 engaged with a wheel rim.
Figure 5B:
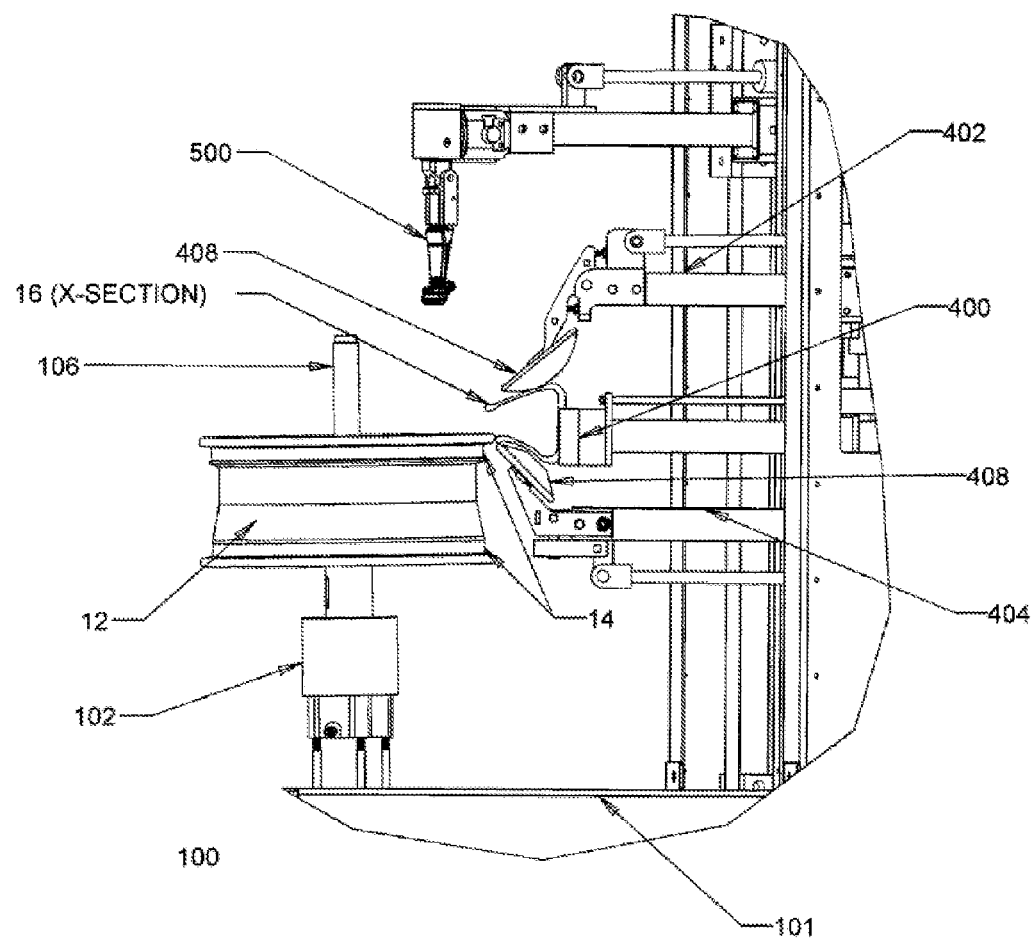
FIG. 5B is a partial side plan view of the tire changing system of FIG. 1 engaged with a tire.

The actuator or clamp tool 400 may be employed by the control system 150 to facilitate dismounting of the tire 16 from the wheel 12. After demounting of the tire 16 from the upper bead seat 14, the tire 16 is preferably lifted up and pushed back toward a bead mount/demount tool 500, (shown in FIG. 9), which is inserted between the tire 16 and the bead seat 14. The lower bead breaker roller 408 is then employed to demount the tire 16 from the lower bead seat surface 14 over the upper lip of the wheel 12. The gap between the beads of the tire 16 and the wheel 12 created by the lift and push motion prevents the roller 408 from pinching the tire 16 against the upper wheel lip. Currently this lifting and pushing motion is a manual step performed by an operator of the tire changing system 100 and requires a significant level of skill as well as trial and error. In an embodiment of the present invention, the control system 150 is configured to actuate the tire clamp tool 400 as seen in FIG. 5B, in conjunction with the bead break rollers 408 to exert the required motion on the tire 16 to lift and push the tire 16 into position, and to initiate the tire demount procedure in one automated sequence.

In another embodiment, as an alternative to, or in the absence of other methods to measure the outside diameter of the tire 16, the tire clamp tool 400 may be extended under control of the control system 150 using a low pressure force until contact with the tire outer diameter is achieved. The position of the tire clamp tool 400 in contact with the tire outer diameter is identified, with the relative displacement from the rotational axis of the mounting assembly 102 providing a measure of the tire outside diameter. This outside diameter, coupled with a known size for the wheel rim 12, provides a measure of the tire wall height. Since different tire wall heights may require different tire changing techniques, the control system 150 can subsequently adjust any required operating parameters for the tire changing system 100 to accommodate the tire undergoing service. Such operating parameters may include inflation air pressure levels, load roller forces, mount/dismount bead breaker clamping forces, etc.

Those of ordinary skill in the art will recognize that the control system of the tire changing system 100 may receive data associated with a wheel/tire assembly 10 and the operation of the tire changing system components from various types of sensors (not shown). For example, the control system 150 may be configured to acquire data of rim runout from a mechanical dataset arm such as is conventionally utilized on wheel balancing systems. A mechanical dataset arm can be fitted with a number of different types of sensors capable of measuring motion, and from which positional measurements may be acquired, for determining wheel dimensions, or a change of position measurement, for the case of measuring runout. The mechanical dataset arm which may include potentiometers, encoders, Hall Effect angle sensors and the like may be configured to acquire data from which both radial and lateral dimensions and runout can be measured.

Those of ordinary skill in the art will recognize that the control system 150 of the tire changing system 100 may be configured to measure the lateral runout of the rim 12 using many of the same techniques as are used for measuring radial runout. The lateral runout measurement could be very useful because there is no guarantee on a tire changer that the rim is mounted coaxially to the center reference of the wheel rotation means.

The present disclosure can be embodied in-part in the form of computer-implemented processes and apparatuses for practicing those processes. The present disclosure can also be embodied in-part in the form of computer program code containing instructions embodied in tangible media, such as floppy diskettes, CD-ROMs, hard drives, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:
1. A tire changing system comprising:
   a mount assembly secured to a framework of the tire changing system, said mount assembly adapted for securing a wheel rim to mount the wheel rim to the tire changing system, said wheel rim including at least one bead seat for contacting a tire;

a motor operatively connected to the mount assembly for rotating said mount assembly about a rotational axis of the tire changing system, thereby to rotate the secured wheel rim;

a controlled component secured to said framework and configured to selectively alter a relative orientation of the wheel rim and the tire;

a sensor for measuring a rotational position of the wheel rim about said rotational axis;

a load roller configured to apply, to the tire mounted on the wheel rim, a generally radial force during rotation of the wheel rim about said rotational axis; and at least one sensor for acquiring a loaded wheel/tire assembly measurement associated with the radial force on the tire applied by the load roller.

2. The tire changing system of claim 1 wherein said controlled component is configured to selectively alter the relative orientation of the wheel rim and the tire by holding the tire, mounted on the wheel rim, in a stationary position during rotation of the wheel rim by the mount assembly.

3. A tire changer, comprising:

a mount assembly secured to a framework for receiving at least a wheel rim of a wheel/tire assembly, the mount assembly having a rotational axis;

a load roller being able to contact a peripheral surface of the wheel/tire assembly and to apply a force to the peripheral surface of the wheel/tire assembly;

a control system for controlling the force applied by the load roller during a rotation of the wheel/tire assembly about the rotational axis of the mount assembly;

a sensor for measuring force variations acting between the peripheral surface of the wheel/tire assembly and the load roller;

wherein an actuation mechanism of the load roller and of the mount assembly is designed for a relative movement of the load roller and of the mount assembly towards each other along a straight line to apply the force to the peripheral surface of the wheel/tire assembly; and further including upper and lower roller assemblies secured to said framework and configured to selectively apply a clamping force to a tire of the wheel/tire assembly.

4. The tire changer of claim 3 wherein said upper and lower roller assemblies are further configured to apply sufficient clamping force to selectively alter a relative orientation of the wheel rim and the tire by holding the tire, mounted on the wheel rim, in a stationary position during rotation of the wheel rim by the mount assembly.

5. The tire changer of claim 3 wherein said control system is further configured to calculate an angular remount position for a tire on said wheel rim utilizing measured force variations communicated from said sensor.

6. The tire changer of claim 3 wherein said control system is further configured to identify, utilizing measured force variations communicated from said sensor, a rotational mounting orientation for a tire on said wheel rim by identifying a first location on said tire and a second location on said wheel rim for rotational alignment with each other.

7. A method for measuring force variations acting between a peripheral surface of a wheel/tire assembly and a load roller of a tire changing system having a mount assembly secured to a framework for positioning and rotating the wheel/tire assembly about a rotational axis, and upper and lower roller assemblies secured to said framework to selectively apply a clamping force to a tire of the wheel/tire assembly, comprising:

mounting the wheel/tire assembly on said mount assembly;

engaging the load roller and the wheel/tire assembly to apply a force to a peripheral surface of the wheel/tire assembly; and measuring force variations acting between the peripheral surface and the engaged load roller while the wheel/tire assembly is rotated about the rotational axis by the mount assembly, said measured force variations representative of at least one of a radial force or a lateral force.

8. The method of claim 7 further including the step of calculating a relative angular mounting orientation between a tire of said wheel/tire assembly and a wheel of said wheel/tire assembly utilizing said measured force variations.

9. The method of claim 8 further including the step of altering a current mounting orientation between the tire and the wheel to achieve said calculated relative angular mounting orientation between said tire and said wheel by applying a clamping force to said tire with said upper and lower roller assemblies during rotation of the wheel rim by the mount assembly.

10. The method of claim 8 further including the step of identifying said calculated relative angular mounting orientation between said tire and said wheel by marking a location on, illuminating a location on, or rotationally positioning, said wheel/tire assembly.

11. The method of claim 7 wherein said step of engaging includes engaging the load roller and the wheel/tire assembly by displacement towards each other along a straight line to apply the force to the peripheral surface of the wheel/tire assembly.

12. A method for altering a mounting of a tire on a wheel rim using a tire changing system having a mount assembly for positioning and rotating a wheel assembly, consisting of the wheel rim and tire, about a rotational axis, and a load roller assembly configured to apply a generally radial load to the wheel assembly, comprising:

mounting the rim of the wheel assembly on said mount assembly;

actuating the load roller assembly to engage the wheel assembly and apply a generally radial load to said wheel assembly during a driven rotation of said wheel assembly about an axis of rotation;

acquiring measurements associated with said applied load on said wheel assembly during rotation of said wheel assembly;

identifying an alteration to a rotational mounting orientation of said tire on said wheel rim utilizing said acquired measurements by identifying a first location on said tire and a second location on said wheel rim to be brought into rotational alignment with each other; and altering, without removing the wheel rim from the mount assembly, the rotational mounting orientation of said tire on said wheel rim by aligning said first location on said tire with said second location on said wheel rim.

13. The method of claim 12 wherein said step of identifying includes providing a visual identification of said first and second locations to an operator.

14. The method of claim 13 wherein said step of providing a visual identification includes presenting representations of said first and second locations on a display.

15. The method of claim 12 wherein said step of identifying includes selectively rotating said wheel assembly to a predetermined position for marking of said first and second locations.

16. The method of claim 12 further including the step of measuring wheel rim runout at a bead seat of the wheel rim with respect to said axis of rotation; and wherein said step of identifying a rotational mounting orientation further includes utilizing said wheel rim runout together with said acquired measurements to identify a rotational mounting orientation minimizing at least one uniformity parameter of the wheel assembly.

17. A method for altering a mounting of a tire on a wheel rim using a tire changing system having a load roller assembly configured to apply a generally radial load to a wheel assembly consisting of the tire mounted to the wheel rim, disposed on the tire changing system, comprising:

securing said wheel rim of said wheel assembly to a mount assembly for rotation about an axis;
   actuating the load roller assembly to engage the wheel assembly and apply a generally radial load to said wheel assembly during a driven rotation of said wheel assembly about said axis of rotation;
   acquiring measurements associated with said applied load on said wheel assembly during rotation of said wheel assembly;
   identifying a rotational mounting orientation for said tire on said wheel rim utilizing said acquired measurements; and
   altering a relative rotational mounting orientation of said tire on said wheel rim to match said identified rotational mounting orientation while said wheel rim remains secured to said mount assembly.

18. The method of claim 17 wherein said step of altering said relative rotational mounting orientation further includes engaging and holding said tire stationary relative to said wheel rim with a controlled component, while said wheel rim is rotated concentrically within said tire by said mount assembly to the identified rotational mounting orientation.

19. A wheel assembly service method for mounting a tire to a wheel rim on a tire changing system, comprising:

securing said wheel rim to a mount assembly for rotation about an axis;
   measuring runout about a circumference of the wheel rim;
   mounting the tire to said wheel rim to form a wheel assembly;
   measuring wheel assembly loaded force variations about the circumference of the tire mounted to said wheel rim;
   identifying an angular mounting position of the tire with respect to said wheel rim in response to said measured runout and said measured wheel assembly loaded force variation which minimizes at least one uniformity parameter for the wheel assembly; and
   while said wheel rim remains secured to said mount assembly, altering an angular mounting of the tire with respect to said wheel rim to align with said identified angular mounting position.

20. The wheel assembly service method of claim 19 wherein said step of altering said angular mounting position includes holding the tire stationary while the wheel rim is rotated concentrically within the tire by said mount assembly.

* * * * *